United States Patent
McAnally et al.

(10) Patent No.: US 7,925,456 B2
(45) Date of Patent: Apr. 12, 2011

(54) METHOD AND APPARATUS FOR DIRECTING THE USE OF A CORIOLIS FLOW METER

(75) Inventors: Craig B. McAnally, Thornton, CO (US);
Andrew T. Patten, Boulder, CO (US);
Charles P. Stack, Louisville, CO (US);
Jeffrey S. Walker, Louisville, CO (US);
Neal B. Gronlie, Estes Park, CO (US)

(73) Assignee: Micro Motion, Inc., Boulder, CO (US)

( * ) Notice: Subject to any disclaimer, the term of this patent is extended or adjusted under 35 U.S.C. 154(b) by 658 days.

(21) Appl. No.: 11/722,660

(22) PCT Filed: Dec. 30, 2004

(86) PCT No.: PCT/US2004/044063
§ 371 (c)(1),
(2), (4) Date: Jun. 22, 2007

(87) PCT Pub. No.: WO2006/073388
PCT Pub. Date: Jul. 13, 2006

(65) Prior Publication Data
US 2008/0189054 A1    Aug. 7, 2008

(51) Int. Cl.
*G01F 1/84* (2006.01)
*G01F 25/00* (2006.01)
*G01R 35/00* (2006.01)

(52) U.S. Cl. ............ 702/45; 702/85; 702/86; 702/87; 702/88; 702/89; 702/90; 702/91; 702/100; 702/104; 702/105; 702/119; 702/120; 702/121; 702/122; 702/123; 73/861.18; 73/861.19; 73/861.21; 73/861.22; 73/861.23; 73/861.24; 73/861.25; 73/861.26; 73/861.27; 73/861.28; 73/861.29; 73/861.31

(58) Field of Classification Search ............... 702/45, 702/100, 85–91, 104, 105, 108, 116, 119–123, 702/148; 73/861.18–861.31
See application file for complete search history.

(56) References Cited

U.S. PATENT DOCUMENTS

| 4,911,006 A | 3/1990 | Hargarten et al. |
| 4,996,871 A * | 3/1991 | Romano ............... 73/32 A |

(Continued)

FOREIGN PATENT DOCUMENTS

JP    2002/243613    8/2002

(Continued)

OTHER PUBLICATIONS

Proving Coriolis Flowmeters; 1998; Micro Motion, Inc; whole documet.*

*Primary Examiner* — Sujoy K Kundu
(74) *Attorney, Agent, or Firm* — The Ollila Law Group LLC (57) ABSTRACT

A method and apparatus is disclosed that guides a user through a sequence of steps that will allow the user to complete a predefined task using the flow meter. The steps include: selecting a predefined task, displaying a sequence of steps that directs the user through a process for using the Coriolis flow meter to complete the predefined task, and operating the Coriolis flow meter in response to the sequence of steps to complete the predefined task.

15 Claims, 5 Drawing Sheets

U.S. PATENT DOCUMENTS

| | | |
|---|---|---|
| 5,072,416 A | 12/1991 | Francisco et al. |
| 6,092,409 A * | 7/2000 | Patten et al. .................... 73/1.34 |
| 6,327,915 B1 * | 12/2001 | Van Cleve et al. ....... 73/861.357 |
| 6,678,624 B2 | 1/2004 | Normen |
| 2002/0049564 A1 * | 4/2002 | Johansson et al. ............ 702/184 |
| 2003/0163219 A1 * | 8/2003 | Flesher .......................... 700/185 |
| 2004/0207637 A1 | 10/2004 | Pauly et al. |
| 2004/0216509 A1 * | 11/2004 | Antonijevic ................... 73/1.16 |
| 2006/0010990 A1 * | 1/2006 | Matt et al. ................ 73/861.357 |

FOREIGN PATENT DOCUMENTS

| | | |
|---|---|---|
| RU | 2216714 C2 | 11/2003 |
| WO | 99/39164 A1 | 8/1999 |
| WO | 2003102514 A1 | 12/2003 |

* cited by examiner

Two Rate Calibration y = 1.0290631x + 1.0516252

True Flow Rate
FIGURE 5

METHOD AND APPARATUS FOR DIRECTING THE USE OF A CORIOLIS FLOW METER

BACKGROUND OF THE INVENTION

1. Field of the Invention

The invention is related to the field of flow meters, and in particular, to Coriolis flow meters.

2. Description of the Prior Art

Because Coriolis Flow meters don't have any internal moving parts there is nothing to wear or break. Therefore in a clean fluid, the expectation is that the flow meter will not change its measurement characteristics over time. Unfortunately some fluids may cause corrosion or erosion of the conduits inside the flow meter. Another problem may occur for fluids that can deposit coatings along the internal diameter of the conduits in the Coriolis flow meter. Both types of activities (removing material or depositing material) may cause the flow meter measurement characteristics to change. One way to detect and correct these problems is to prove the flow meter to recalibrate the meter's measurement characteristics. Proving is a field calibration method where a known volume is flowed through the flow meter and compared to the flow measured by the flow meter. Provers can be stationary, e.g. mounted permanently next to the meter, or truck mounted so that the prover can calibrate a plurality of meters. A typical prover is a device with a pipe (104) of a known internal diameter. A ball or piston (102) slides inside the pipe (104) and passes two sensors (S1,S2) or detectors. The first sensor (S1) signals the prover's computer to start counting pulses from the flow meter being calibrated. The pulses are typically proportional to volume flow rate. The second sensor (S2) signals the prover to stop counting pulses from the meter being calibrated. The volume inside the pipe between the two detectors is well known and often compensated for pressure and temperature. The total volume between the two detectors is compared to the number of pulses from the flow meter and a meter factor is determined. The meter factor is simply a correction factor applied to the meter's output. Depending on the volume of the prover and the flow rate used, the measurement time for the known volume to pass through the flow meter may be from 0.5 seconds to 60 seconds. Provers often have a length of pipe that the ball or piston travels before crossing the first detector. This length of pipe is typically called the "prerun." The prerun length is equivalent to a fixed volume. The prerun time is dependent on flow rate. At high flow rates, the prerun time may be quite short.

Another way that the meter's measurement characteristics can be verified is by measuring the density of a material having a well known density. When the density measurement from the flow meter matches the known density, the meter's measurement characteristics are still accurate. See for example U.S. Pat. No. 6,092,409 "System for validating calibration of a Coriolis flowmeter" issued Jul. 25, 2000, which is hereby incorporated by reference for all that it teaches. Unfortunately, verifying the meter's measurement characteristics by measuring density or by proving, requires an operator that is familiar with the operation and settings of the Coriolis flow meter. Obtaining an experienced operator to verify a meter's measurement characteristics is not always possible.

Therefore there is a need for a system and method for guiding a user through the steps for using the meter to complete a predefined task.

SUMMARY OF THE INVENTION

A method and apparatus is disclosed that guides a user through a sequence of steps that will allow the user to complete a predefined task using the flow meter. The steps include: selecting a predefined task, displaying a sequence of steps that directs the user through a process for using the Coriolis flow meter to complete the predefined task, and operating the Coriolis flow meter in response to the sequence of steps to complete the predefined task.

Aspects

One aspect of the invention includes, a method, comprising:

selecting a predefined task to be completed using a Coriolis flow meter;

displaying a sequence of steps for using the Coriolis flow meter to complete the predefined task;

receiving user response to the sequence of steps;

operating the Coriolis flow meter in accordance to the user response to complete the predefined task.

Preferably, the method further comprises selecting the predefined task is done by starting a guru module that corresponds to the predefined tasks.

Preferably, the method further comprises selecting the predefined task is done by selecting a predefined task from a plurality of predefined tasks in a guru module.

Preferably, the method further comprises the selected predefined task is the verification of the flow calibration factor for the Coriolis flow meter.

Preferably, the method further comprises:

prompting a user to select a material with a known density;

prompting the user to select a required accuracy for a Coriolis flow meter;

determining a density deviation from the known density that corresponds to the required accuracy;

directing the user to introduce the material into the Coriolis flow meter;

measuring the density of the material using the Coriolis flow meter;

comparing the measured density with the known density;

when the measured density is different than the known density by more than the density deviation, alerting the user that an error condition exists.

Preferably, the method further comprises the density of the material is measured for at least 5 minutes.

Preferably, the method further comprises the user is prompted to select a material with a known density from a plurality of displayed materials.

Preferably, the method further comprises where water is one of the plurality of displayed materials.

Preferably, the method further comprises where the relationship between the required accuracy (RC) and the density deviation (DD) is $$DD\ g/cc = \pm\left(\frac{0.001\ g/cc * RC}{0.06\%}\right).$$

Preferably, the method further comprises where the measured density is stored using a non-volatile medium.

Preferably, the method further comprises:

repeating the density measurement of the material of a known density on a periodic bases and comparing the newly measured results with the stored density measurement.

Preferably, the method further comprises:

measuring the stability, over a given time period, of at least one parameter used by the Coriolis flow meter before starting the density measurement of the material with the known density.

Preferably, the method further comprises where at least one parameter is selected from the group: density, live zero, temperature, drive gain, and flow.

Preferably, the method further comprises the predefined task is proving the Coriolis flow meter using a prover.

Preferably, the method further comprises the steps:
prompting the user to enter the proving run information;
configuring the Coriolis flow meter for the proving run using the entered proving run information.

Preferably, the method further comprises:
coordinating the operation of the Coriolis flow meter during the proving run.

Preferably, the method further comprises the proving run information comprises the flow rate, the proving volume, the pre-run volume, and flow rate units.

Preferably, the method further comprises the Coriolis flow meter parameters configure comprise: the frequency output, the damping rate, and the signal processing speed.

Preferably, the method further comprises the predefined task is the linearization of the Coriolis flow meter using information from two proving runs at two different flow rates.

Preferably, the method further comprises the steps:
prompting the user to enter the data from the two proving runs;
calculating a new Coriolis flow calibration (CFC) and a new zero offset using the data from the two proving runs;
updating the Coriolis flow meter CFC and zero offset.

Preferably, the method further comprises the steps:
coordinating the proving of the meter using a prover at the two different flow rates;
calculating a new Coriolis flow calibration (CFC) and a new zero offset using the data from the two proving runs;
updating the Coriolis flow meter CFC and zero offset.

Another aspect of the invention comprises:
a Coriolis flow meter;
a computer system, including a display, connected to the Coriolis flow meter;
a Coriolis control module, running on the computer system, where the Coriolis control module is configured to control the Coriolis flow meter;
a Coriolis guru module, running on the computer system, configured to communicate with the Coriolis control module;
the Coriolis guru module configured to display a sequence of steps that directs a user through a process for using the Coriolis flow meter to complete a predefined task.

Preferably, the method further comprises the sequence of steps comprise:
prompting a user to enter proving run information;
configuring the Coriolis flow meter for a proving run using the entered proving run information;
coordinating the operation of the Coriolis flow meter during the proving run.

Preferably, the method further comprises the sequence of steps comprise:
prompting a user to enter data from two proving runs where the two proving runs used different flow rates;
calculating a new Coriolis flow calibration (CFC) and a new zero offset using the data from the two proving runs;
updating the Coriolis flow meter CFC and zero offset.

Preferably, the method further comprises the sequence of steps comprise:
prompting a user to select a material with a known density;
directing the user to flow the material through the Coriolis flow meter;
measuring the density of the material using the Coriolis flow meter;
comparing the measured density with the known density; when the measured density is different than the known density by more than a predetermined amount, alerting the user that an error condition exists.

Preferably, the method further comprises:
prompting the user to select a required accuracy for the Coriolis flow meter;
determining a density deviation from the known density that corresponds to the required accuracy;
setting the predetermined amount equal to the density deviation.

Preferably, the method further comprises the relationship between the required accuracy (RC) and the density deviation (DD) is $$DD \text{ g/cc} = \pm \left( \frac{0.001 \text{ g/cc} * RC}{0.06\%} \right).$$

Preferably, the method further comprises:
measuring the stability, over a given time period, of at least one parameter used by the Coriolis flow meter before starting the density measurement of the material with the known density.

Preferably, the method further comprises at least one parameter is selected from the group: density, live zero, temperature, drive gain, and flow.

Another aspect of the invention comprises a computer product, comprising:
computer code stored on a computer readable medium that when executed by a computer, will perform a sequence of steps, the steps comprising:
prompting a user to select a predefined task to be completed using a Coriolis flow meter;
displaying a sequence of steps that directs the user through a process for using the Coriolis flow meter to complete the predefined task;
operating the Coriolis flow meter in response to the sequence of steps to complete the predefined task.

Preferably, the method further comprises the selected predefined task is the verification of the flow calibration factor for the Coriolis flow meter.

Preferably, the method further comprises the selected predefined task is proving the Coriolis flow meter using a prover.

Preferably, the method further comprises the selected predefined task is the linearization of the Coriolis flow meter using information from two proving runs at two different flow rates.

Another aspect of the invention comprises a Coriolis flow meter system, comprising:
a Coriolis flow meter;
a computer system, including a display, connected to the Coriolis flow meter;
a Coriolis control module, running on the computer system, where the Coriolis control module is configured to control the Coriolis flow meter; a means for directing a user through a sequences of steps that directs a user through a process for using the Coriolis flow meter to complete a predefined task.

DETAILED DESCRIPTION OF THE PREFERRED EMBODIMENT

FIGS. 2-5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1A:
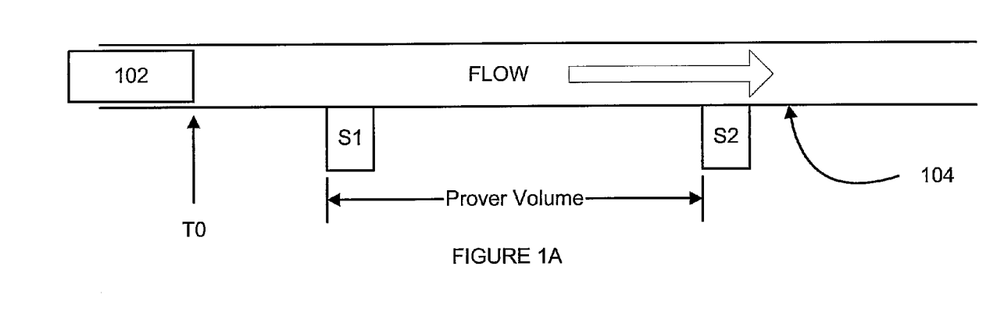
FIG. 1A is a block diagram of a prover at the start of a measurement cycle.
Figure 1B:
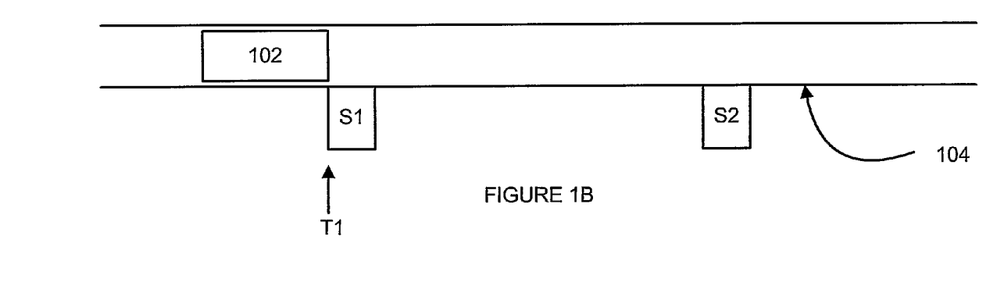
FIG. 1B is a block diagram of a prover at time T1 in a measurement cycle.
Figure 1C:
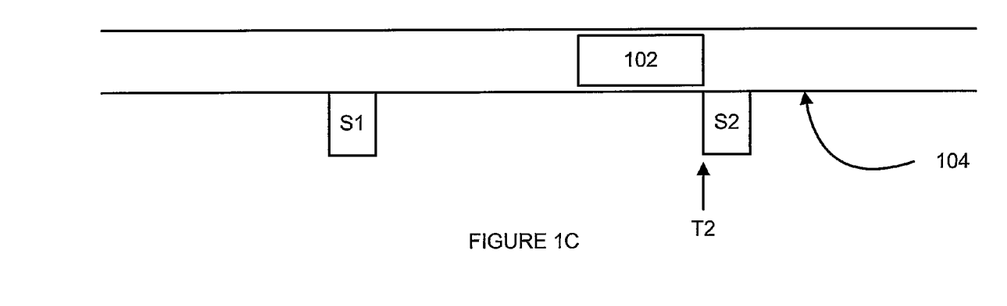
FIG. 1C is a block diagram of a prover at time T2 in a measurement cycle.
Figure 2:
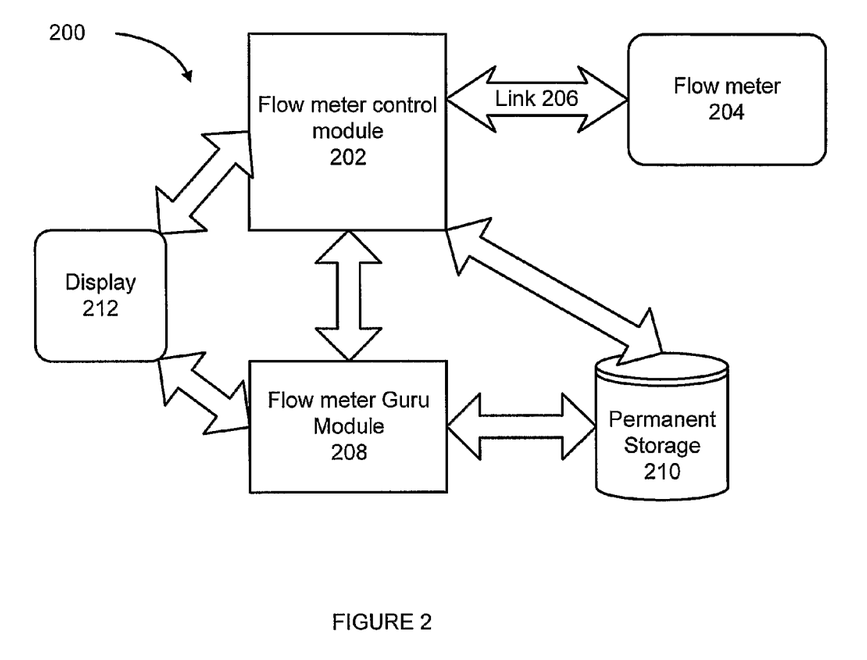
FIG. 2 is a block diagram of a system in an example embodiment of the current invention.

FIG. 2 is a block diagram of a system 200 in an example embodiment of the current invention. System 200 has a flow meter 204, a flow meter control module 202, a flow meter guru module 208, permanent storage 210, and a display 212. In one embodiment the flow meter is a Coriolis flow meter. Flow meter control module 202 is connected to flow meter 204 across link 206. Flow meter control module 202 is configured to communicate with flow meter guru module 208, permanent storage 210 and display 212. Flow meter control module 202 may be implemented as a hardware/software combination, or may be implemented as software running on a computer, for example a PC. Flow meter guru module 208 is configured to communicate with display 212, flow meter control module 202, and permanent storage 210. Flow meter guru module 208 may be implemented as a hardware/software combination or may be implemented as software running on a computer. Flow meter guru module 208 and flow meter control module 202 may be running on the same computer or may be operating on two separate computers configured to communicate with each other. When Flow meter guru module 208 and flow meter control module 202 are operating on the same computer, they may be two separate programs or they may be two modules of the same program.

In operation, flow meter control module 202 monitors and controls flow meter 204. Flow meter control module 202 has access to and can set the various operating parameters for flow meter 204, for example the vibration mode, the damping factor, the user output signal type, calibration factors, and the like. Typically, setting the operating parameters in the flow meter control module for proper operation of flow meter 204 requires some familiarity in the operation of flow meters. Requiring a non-skilled user to operate the flow meter using the flow meter control module 202 to perform calibration verification, may cause confusion to the user and a failure to properly verify the calibration of the meter. Flow meter guru module 208 communicates with, and can initiate actions from, flow meter control module 202. Flow meter guru module 208 is configured to guide a user through a sequence of steps that allows a user to complete a task using the flow meter. In one example embodiment of the current invention, there is a flow meter guru module for each task. The user would select the corresponding flow meter guru module for the task the user wishes to complete. Once selected, the flow meter guru module would guide the user through the steps required to perform the task. In another embodiment, there may be only one flow meter guru module that allows a user to select a task from a plurality of available tasks. One of the tasks that may be available using a flow meter guru module is the verification of the meter calibration factors using a material with a well known density.

Figure 3:
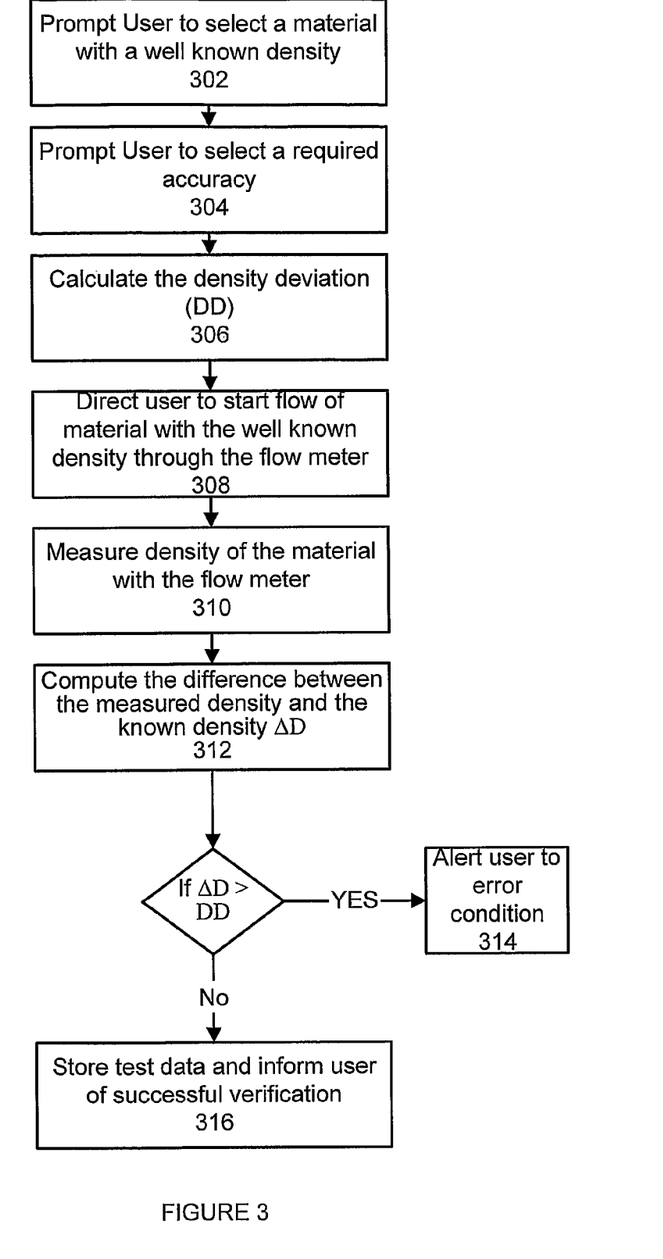
FIG. 3 is a flow chart showing the steps for verification of meter calibration factors using a fluid with a known density in an example embodiment of the invention.

FIG. 3 is a flow chart showing the steps for verification of meter calibration factors using a fluid with a known density, in one example embodiment of the current invention. At step 302 the user is prompted to select a material having a known density. Once the user has selected a material, the user is prompted to select a required accuracy at step 304. A density deviation (DD) amount is calculated at step 306. At step 308 the user is directed to begin flowing the material having the known density, through the flow meter. At step 310 the flow meter will measure the density of the material flowing through the meter. Once the density has been measured, a delta difference $\Delta D$ between the measured density and the known density is computed (312). The $\Delta D$ is compared to the density deviation (DD). When the $\Delta D$ is greater than or equal to the DD then the user is alerted that an error condition exist (314). When the $\Delta D$ is less than the DD, the test data is stored and the user is informed of the successful verification of the meter calibration factors (316). In an alternate embodiment at step 308 the user may be directed to just fill the flow meter with the material for the measurement instead of flowing the material through the flow meter during the measurement.

In one embodiment of the current invention, the user may select a material from a list of possible materials presented to the user. The presentation of the list of materials can be done using any of the known user interface (UI) techniques, for example a drop down menu, a list of radio buttons, or the like. In one embodiment the list of materials will comprise water, liquefied natural gas (LNG) and compressed natural gas (CNG). In another embodiment, the user may enter the name of the material or may enter the density of the material to be used. In some cases, when a user selects a gas to be used as the flow material, the density of the gas will be limited to between 0.0 and 0.60 g/cc. When a gas has been selected, the user may be prompted to enter the operating temperature and pressure used during the flow.

In one example embodiment of the invention, the user will be prompted to select an accuracy, in percent, for the worst case limit of the mass flow measurement through the flow meter. The selection may be done from a plurality of choices, or may be typed in by the user. Some Coriolis flow meters experience a 0.06% change in mass flow measurement for every 0.001 g/cc variation between a known density and a measured density. Using this relationship between flow measurements and density measurements, the accuracy selected by the user can be converted into control points for the density measurements. For example, assume that the meter needs to be validated to better than 0.3% for flow measurements. The user would select 0.3%. The allowable difference between the measured density and the known density is the density deviation (dd). The density deviation is calculated from equation 1:

$$dd = \frac{RA\ \%}{0.06\%} 0.001\ g/cc \qquad \text{Equation 1}$$

where dd is the density deviation and RA is the required accuracy. For the example above where the required accuracy is 0.3%, the density deviation would be plus or minus 0.005 g/cc.

Once the preliminary information has been entered into the system, the user will be instructed to start the flow of material through the flow meter. In one embodiment of the current invention, once the flow of material starts, a stability check for a predetermined time, may be performed on the primary variables used in the calibration verification. In one example embodiment, the variables will be tracked during a 1 minute window to ensure that they are stable to within a 2 sigma confidence level. The variables and their stability windows may include: density to within +/−0.001 g/cc, Live Zero to within 2× zero stability of the meter, temperature within +/−0.25 deg C., Drive gain within 5%, Flow within 5%, and the like.

If any of the primary variables fall outside of their stability range, the user should be notified, for example by a graphical display. In one example embodiment the verification check will not start until the stability check has been successfully completed.

The next step is the measurement phase. In one example embodiment of the invention, measurements from the flow meter will be taken over a period of time, for example 5 minutes. During this phase, a progress indicator may be displayed to update the user on the status of the measurements. During the measurement phase, a number of parameters from the flow meter will be monitored. These measurements may be stored to a non-volatile storage area, for example a hard disk. The parameters that are monitored may include: flow rate, indicated density, temperature, drive gain, pressure (if available), tube frequency, and the like. Once the measurement phase has been completed, the user may be instructed to stop the flow of material through the flow meter.

A delta difference is calculated between the known density of the material and the density measured by the flow meter. The delta difference is compared to the density deviation (dd). If the delta difference is greater than or equal to the density deviation, the meter will have failed the calibration verification and the user will be informed of the error condition. If the delta difference is smaller than the density deviation, the flow meter's calibration factors have passed the verification. In one example embodiment of the invention, the test data may be stored to a non-volatile storage device for later use.

In one example embodiment of the invention, the measurement data will be used to track the calibration of the flow meter over time. The first time the flow meter's calibration factors are checked, the data will be used to baseline the flow meter. This means that, if the meter passes the verification check, the delta difference will be stored and used in subsequent tests to normalize the new delta differences. By storing the data from each verification test, the flow meters performance, over time, may be tracked.

Figure 4:
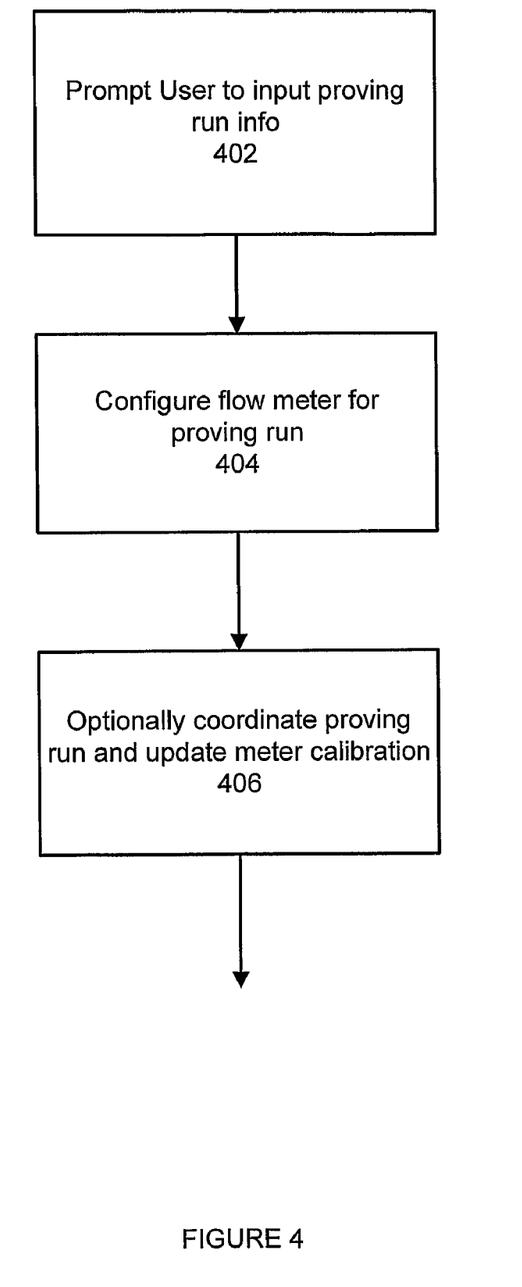
FIG. 4 is a flow chart showing the steps for using a guru module to setup all the parameters in the Coriolis flow meter for a proving run in one example embodiment of the invention.

In another example embodiment of the current invention, the task selected would aid the user in proving the meter using a prover. FIG. 4 is a flow chart showing the steps for using a guru module to setup all the parameters in the Coriolis flow meter for a proving run in one example embodiment of the invention. At step 402 the user is prompted to input information about the upcoming proving runs, for example the type of prover being used, the volume for each proving run, the flow rates to be used, pre-run volumes, flow rate units (mass or volume), and the like. At step 404 the guru module uses the information in configuring the Coriolis flow meter for the proving run. The pre-run volume and the proving volume are used in combination with the flow rates to determine the pre-run time and the proving time. These times are then used to help determine the frequency output, the damping rate, signal processing speed, and the like. For example, the signal processing delay (one component of damping) must be set such that the signal processing delay is a fraction of the pre-run time to allow the flow measurement to become stable before the prove starts. The processor speed must be set fast enough so that the signal processing delay and the communications delays are fractions of the pre-run times and the proving run times. Setting the processor speed is also a trade off between the steady state response of the meter vs. the transient response of the meter. The meter response time must also be set to be a fraction of the pre-run time so that the meter measurement has stabilized during the pre-run time. The processor speed will be set at the slowest possible speed that still meets the delay criteria and the response time criteria. The frequency output must be set such that the output does not over range for high flow rates and must be set such that there is adequate resolution at low flow rates.

Once the meter parameters have been setup, at step 406 the guru unit may optionally coordinate/start the proving run and update the meter calibration factor using the results from the proving run. During the proving run the guru module, in cooperation with the flow meter control module, may perform a flow and signal stability check. For example, the guru module would track the measured flow rate through the pre-run time, and between the start and stop signals for the proving run. The maximum and minimum flow rates as well as the mean and standard deviations will be determined. These results can be compared to the API guidelines and the user may be notified if the guidelines are not met.

Once the proving run has been completed, a guru module may be used to check the repeatability of the meter calibration factor. In one example embodiment, the repeatability steps are additional optional steps included in the guru module of FIG. 4. In another example embodiment, the repeatability check may be a separate stand alone task. For the repeatability task the guru module receives the results from a proving run (the flow error). The user may input the results or the guru module may receive the results directly from the prover or from the flow meter control module. The desired accuracy is also entered into the guru module. Using this information the guru module will determine the number of proving runs that must be completed for the desired repeatability. The guru module may optionally coordinate/start the proving runs and monitor the run results to confirm that the required repeatability has been achieved.

Figure 5:
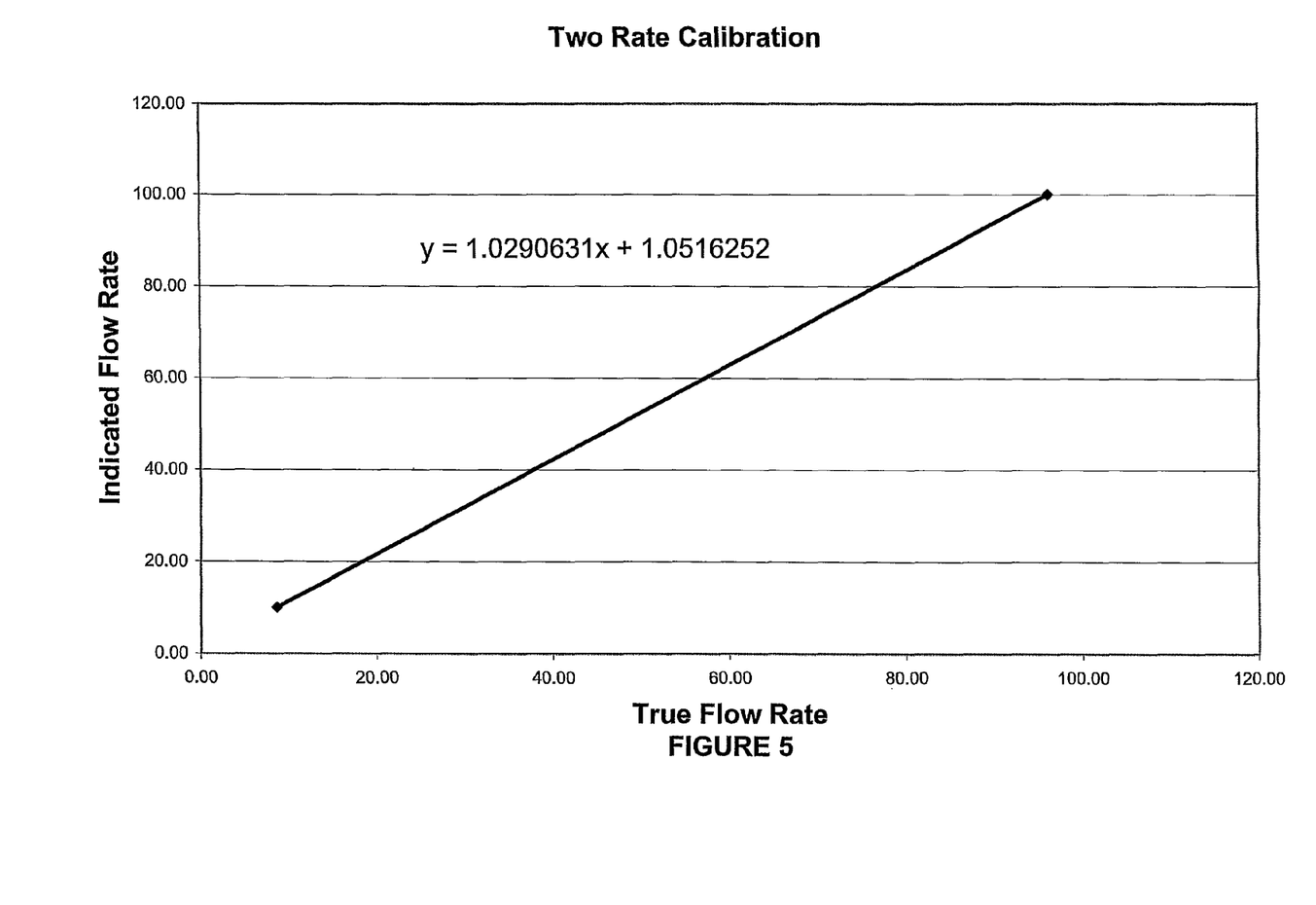
FIG. 5 is a plot of the indicated flow vs. the true flow for two different proving runs.

In another example embodiment of the current invention, the task selected would be the linearization of the Coriolis flow meter using the results from at least two proving runs at different flow rates. In one embodiment the data from two or more proving runs would be entered by the user or loaded from permanent storage, for example a file. In another embodiment the guru module would assist the user in setting up and performing the different proving runs. When setting up the proving runs, the linearization guru module may call the proving guru modules describe above or may have the proving module code integrated into the linearization guru module. The Coriolis flow calibration factor (FCF) and the meter zero offset can be determined using the indicated flow rates vs. the true flow rates for the two or more different proving runs at the two different flow rates. FIG. 5 is a plot of the indicated flow vs. the true flow for two different proving runs. For the first run the flow rate indicated was 10 lb/min and the true flow rate was 8.70 lb/min. The second run had an indicated flow rate of 100 lb/min and a true flow rate of 96.15 lb/min. The meter was using an original FCF of 47.4 with a zero offset of 5 ns. The new FCF is the original FCF divided by the slope of the plotted line or $FCF_n = FCF_o/\text{slope}$. The new zero offset is equal to the zero intercept of the graph divided by the original FCF plus the original zero offset or $Zero_n = (\text{Intercept}/FCFo) + Zero_o$. The graph intercept is in lb/min and the FCF is in grams/sec/μsec so there is some unit conversion involved. Using the two flow rates plotted in FIG. 5, the new FCF is 46.06132=(47.4/1.0290631). The new zero offset is 172.724 ns (1.0516252/47.4)(7559.872 unit conversion)+5.

We claim:

1. A method, comprising:
   selecting a predefined task to be completed using a Coriolis flow meter, wherein the predefined task is verification of a flow calibration factor for the Coriolis flow meter;
   prompting a user to select a material with a known density;
   prompting the user to select a required accuracy for the Coriolis flow meter;
   determining a density deviation from the known density that corresponds to the required accuracy;
   directing the user to introduce the material into the Coriolis flow meter;
   measuring the density of the material using the Coriolis flow meter;
   comparing the measured density with the known density; and
   when the measured density is different than the known density by more than the density deviation, alerting the user that an error condition exists.

2. The method of claim 1 where selecting the predefined task is done by starting a guru module that corresponds to the predefined task.

3. The method of claim 1 where selecting the predefined task is done by selecting a predefined task from a plurality of predefined tasks in a guru module.

4. The method of claim 1 where the density of the material is measured for at least 5 minutes.

5. The method of claim 1 where the user is prompted to select a material with a known density from a plurality of displayed materials.

6. The method of claim 5 where water is one of the plurality of displayed materials.

7. The method of claim 1 where a relationship between the required accuracy (RA) and the density deviation (DD) is $$DD \text{ g/cc} = \pm\left(\frac{0.001 \text{ g/cc} * RC}{0.06\%}\right).$$

8. The method of claim 1 where the measured density is stored using a non-volatile medium.

9. The method of claim 8 further comprising:
   repeating the density measurement of the material of a known density on a periodic basis and comparing the newly measured results with the stored density measurement.

10. The method of claim 1 further comprising:
    measuring a stability, over a given time period, of at least one parameter used by the Coriolis flow meter before starting the density measurement of the material with the known density.

11. The method of claim 10 where the at least one parameter is selected from: density, live zero, temperature, drive gain, and flow.

12. A system, comprising:
    a Coriolis flow meter;
    a computer system, including a display, connected to the Coriolis flow meter;
    a Coriolis control module, running on the computer system, where the Coriolis control module is configured to control the Coriolis flow meter;
    a Coriolis guru module, running on the computer system, configured to communicate with the Coriolis control module;
    the Coriolis guru module configured to prompt a user to select a predefined task to be completed using the Coriolis flow meter, wherein the predefined task is verification of a flow calibration factor of the Coriolis flow meter, and display a sequence of steps that directs the user through a process for using the Coriolis flow meter to complete the predefined task, wherein the sequence of steps comprise:
    prompting a user to select a material with a known density;
    prompting the user to select a required accuracy for the Coriolis flow meter;
    determining a density deviation from the known density that corresponds to the required accuracy;
    directing the user to flow the material through the Coriolis flow meter;
    measuring a density of the material using the Coriolis flow meter;
    comparing the measured density with the known density; and
    when the measured density is different than the known density by more than the density deviation, alerting the user that an error condition exists.

13. The system of claim 12 where a relationship between the required accuracy (RA) and the density deviation (DD) is $$DD \text{ g/cc} = \pm\left(\frac{0.001 \text{ g/cc} * RC}{0.06\%}\right).$$

14. The system of claim 12 further comprising:
    measuring a stability, over a given time period, of at least one parameter used by the Coriolis flow meter before starting the density measurement of the material with the known density.

15. The system of claim 14 where the at least one parameter is selected from: density, live zero, temperature, drive gain, and flow.

* * * * *

UNITED STATES PATENT AND TRADEMARK OFFICE
CERTIFICATE OF CORRECTION

PATENT NO. : 7,925,456 B2  
APPLICATION NO. : 11/722660  
DATED : April 12, 2011  
INVENTOR(S) : Craig B McAnally et al.

It is certified that error appears in the above-identified patent and that said Letters Patent is hereby corrected as shown below:

Column 9, Line 48 and Line 49 replace the equation with $$DDg/cc = \pm\left(\frac{0.001 g/cc * RA}{0.06\%}\right)$$

Column 10, Line 45 and Line 46 replace the equation with $$DDg/cc = \pm\left(\frac{0.001 g/cc * RA}{0.06\%}\right)$$

Signed and Sealed this  
Sixteenth Day of August, 2011

David J. Kappos  
*Director of the United States Patent and Trademark Office*